United States Patent

Hartz

[11] 4,442,733
[45] Apr. 17, 1984

[54] TRANSMISSION CENTER SUPPORT MOUNTING

[75] Inventor: James F. Hartz, Indianapolis, Ind.

[73] Assignee: General Motors Corporation, Detroit, Mich.

[21] Appl. No.: 392,894

[22] Filed: Jun. 28, 1982

[51] Int. Cl.³ .................. F16H 57/04; F16H 57/02; F02F 5/00; F16C 9/00

[52] U.S. Cl. .................. 74/606 R; 74/467; 277/26; 403/29

[58] Field of Search ............... 74/606 R, 467; 29/429, 29/226, 434, 467, 451, 525; 308/DIG. 14; 384/278; 403/29, 30, 28; 274/26; 184/6.12

[56] References Cited

U.S. PATENT DOCUMENTS

| | | | |
|---|---|---|---|
| 3,084,003 | 4/1963 | Matt et al. | 384/278 |
| 3,097,546 | 7/1963 | Kelbel et al. | 74/467 |
| 3,146,629 | 9/1964 | Schmitter | 74/467 |
| 3,653,118 | 4/1972 | Koivunen | 29/434 |
| 3,730,022 | 5/1973 | O'Malley | 74/759 |
| 3,765,519 | 10/1973 | Kell | 188/366 |
| 4,110,888 | 9/1978 | Mutou | 29/434 |
| 4,112,786 | 9/1978 | Thomas | 74/606 R |
| 4,152,957 | 5/1979 | Watanabe et al. | 74/606 R |
| 4,241,622 | 12/1980 | Kubo et al. | 74/606 R |
| 4,281,941 | 8/1981 | Rotterkolber | 403/29 |

Primary Examiner—Lawrence J. Staab
Assistant Examiner—Michael D. Bednarek
Attorney, Agent, or Firm—Saul Schwartz

[57] ABSTRACT

A power transmission having fluid actuated ratio establishing devices has a center support disposed in a cylindrical main bore of the transmission case and a plurality of elastomeric shims around the center support in an annular gap between the latter and the main bore. Each shim has a spacer portion in compression between the center support and the main bore which spacer portions exert balanced radially directed forces on the center support operative to centralize the latter in the main bore and the shims have coefficients of thermal expansion sufficiently exceeding the coefficients of thermal expansion of the case and/or the center support to maintain the spacer portions in compression throughout the operating temperature range of the transmission. In addition, one of the compressed spacer portions is interposed between a fluid supply passage in the case and a passage in the center support and has an aperture in register with the passages so that the spacer portion forms a gasket preventing fluid leakage into the gap.

3 Claims, 5 Drawing Figures

TRANSMISSION CENTER SUPPORT MOUNTING

BACKGROUND OF THE INVENTION

1. Field of the Invention

This invention relates generally to power transmissions having fluid actuated ratio establishing devices and, in particular, to improved mountings for fluid directing center supports in transmission cases.

2. Description of the Prior Art

Typical multiple speed automatic transmissions include cases or housings, pluralities of planetary gear sets supported on the housings, and further pluralities of fluid actuated clutches and brakes operatively associated with various ring gears, sun gears, and planet carriers of the planetary gear sets to establish various ratio drives or power flow paths through the transmissions. Often, these various clutches and brakes are arranged along longitudinal axes of the transmissions with each including an annular cylinder for pressurized fluid and an annular piston in each cylinder for applying pressure to friction discs to effect clutching or braking. In order to structurally support fixed or rotating elements of those clutches and brakes located toward the middle of the transmission and to direct pressurized fluid to corresponding ones of the annular cylinders, it has been customary to employ structural members known as center supports. Such members usually are bolted in place in the transmission, provide bearing surfaces for rotating elements, and include fluid passages extending from the various annular cylinders to ports on the transmission cases to which pressurized fluid can be directed by valve bodies. In addition, it has been proposed to interpose thermally responsive intermediate members between the center supports and the cases to maintain the former centralized in main bores in the latter and to provide jumper tubes between the center support and the cases to convey pressurized fluid therebetween. A center support mounting according to this invention represents an improvement over these and other known transmission center support mountings.

SUMMARY OF THE INVENTION

Accordingly, the primary feature of this invention is that it provides a new and improved center support mounting in a power transmission having fluid actuated ratio establishing devices. Another feature of this invention is that it provides a new and improved transmission center support mounting including seal and centralizing means disposed between the center support and the transmission case functioning throughout the operating temperature range of the transmission to centralize the center support in a main bore in the case while maintaining a fluid tight seal between fluid supply means on the case and fluid passages in the center support. Still another feature of this invention resides in the provision in the improved center support mounting of elastomeric seal and centralizing means disposed in compression between the center support and the main bore in the case to resiliently centralize the center support in the main bore while providing a gasket type fluid seal between the fluid supply means on the transmission case and the fluid passages in the center support, the elastomeric material having a coefficient of thermal expansion sufficiently exceeding the coefficients of thermal expansion of one or both of the center support and the case to maintain the centralizing and seal means in substantial compression throughout the normal operating temperature range of the transmission. Yet another and more specific feature of this invention resides in the provision in the new and improved transmission center support mounting of a plurality of elastomeric shims disposed symmetrically around the center support and in compression in an annular gap between the center support and the transmission main bore with one of the shims being interposed between registered or aligned fluid supply passages in the case and fluid passages in the center support and having apertures aligned with the registered passages, the compression of the elastomeric shims functioning to resiliently centralize the center support in the main bore while simultaneously forming a gasket type fluid seal between the passages and the elastomeric material having a coefficient of thermal expansion sufficiently exceeding the coefficients of thermal expansion of the case and the center support to maintain each of the shims in compression throughout the normal operating temperature range of the transmission.

These and other features of this invention will be readily apparent from the following specification and from the drawings wherein:

FIG. 1 a sectional view of a portion of a transmission having fluid actuated ratio establishing devices and a center support mounting according to this invention;

Figure 1:
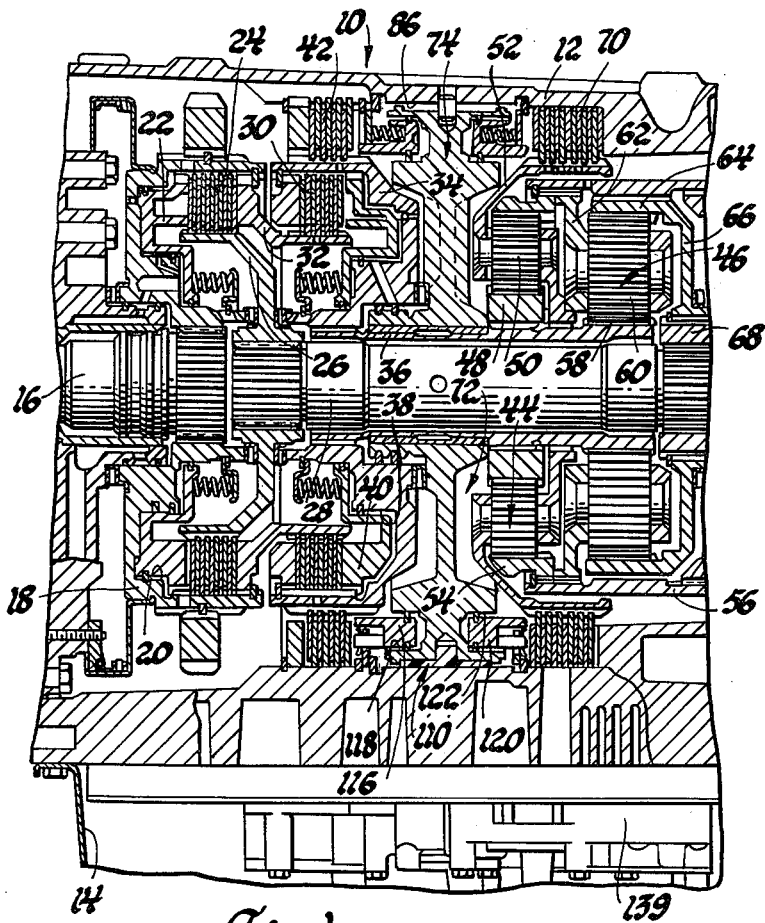

Referring now to FIG. 1 of the drawings and describing the environment in which the center support mounting according to this invention finds utility, a transmission designated generally 10 includes a case 12 adapted for rigid attachment to an engine block or like support and an oil sump 14 bolted to the bottom of the case 12. The case is metal, as for example an aluminum die casting, and supports therewithin a plurality of gear sets, clutches, and brakes now briefly described. An input shaft 16 is connected in conventional fashion to a torque converter turbine or the like, not shown, and provides input torque to the transmission gearing. The input shaft has a first rotating clutch drum 18 splined to the inboard end thereof which clutch drum defines an annular cylinder 20 in which is slidably disposed an annular piston 22. A first clutch pack 24 of interengaging friction discs is disposed between the first drum 18 and a hub 26 and functions to connect the first drum to the hub when the piston 22 is energized by pressurized fluid in cylinder 20 to compress the discs. The hub 26 is rigidly connected to one end of an intermediate shaft 28 colinear with the input shaft 16.

With continued reference to FIG. 1, a second clutch pack 30 of interengaging friction discs is located between an extension 32 of the first clutch drum 18 and a second clutch drum 34 rigidly mounted on one end of a sleeve shaft 36 disposed around and rotatably supported on the intermediate shaft 28. An annular cylinder 38 is defined in the second clutch drum 34 and slidably supports an annular piston 40 operative upon introduction of pressurized fluid to the cylinder 38 to compress the discs of clutch pack 30 in known fashion to rigidly connect the first and second clutch drums 18 and 34. A third clutch pack 42 of interengaging friction discs is disposed between the second rotatable clutch drum 34 and the case 12 in known fashion and functions as more fully described hereinafter as a brake to rigidly connect the drum 34 to the case.

The transmission 10 further includes a pair of planetary gear sets 44 and 46 which are representative of other well known planetary gear combinations. Gear set 44 includes a sun gear 48 rigidly attached to sleeve shaft 36, a plurality of pinions 50 meshing with the sun gear 48 and rotatably supported on a carrier 52, and a ring gear 54 connected to an output drum 56. The gear set 46 includes a sun gear 58 also rigidly attached to the sleeve shaft 36, a plurality of pinions 60 meshingly engaging the sun gear 58 and rotatably supported on a carrier 62 rigidly connected to the output drum 56, and a ring gear 64 meshing with the pinions 60 and rigidly attached to a hub 66. The hub 66 is connected by splines to a sleeve 68 which, in turn, is connected by another set of splines to the intermediate shaft 28. Finally, a fourth clutch pack 70 of interengaging friction discs is disposed between the case 12 and the carrier 52 of the planetary gear set 44 and functions as described hereinafter as a brake to rigidly connect the carrier 52 to the case.

It will, of course, be apparent that the clutches, brakes and gearing thus described are operative to establish a plurality of torque paths or ratio drives through the transmission. For example, if only clutch pack 24 is compressed by piston 22, torque is transmitted from the input shaft 16 through the clutch pack 24, the hub 26, the intermediate shaft 28 and the sleeve 68 to an output member of the transmission, not shown. Alternatively, if the first and second clutch packs 24 and 30 are compressed by pistons 22 and 40, respectively, torque is transmitted from the input shaft 16, through the two clutch packs 24 and 30, to both the intermediate shaft 28 and sleeve shaft 36 wherefrom torque is transmitted through both of the planetary gear sets 44 and 46 to the output drum 56. Still another torque path or ratio drive can be defined by compression of first clutch pack 24 and third clutch pack 42, this torque path being from the input shaft 16, through the clutch pack 24, to the intermediate shaft 28, and then from the intermediate shaft through the sleeve 68, the planetary gear set 46 and the output drum 56 because the sleeve shaft 36 is braked or held fixed by the clutch pack 42. Achievement of these and other possible ratio drives depend upon selective compression of various ones of the four clutch packs described which compression depends upon selective distribution of pressurized hydraulic fluid to corresponding ones of the cylinders associated with the pistons compressing the clutch packs.

Figure 2:
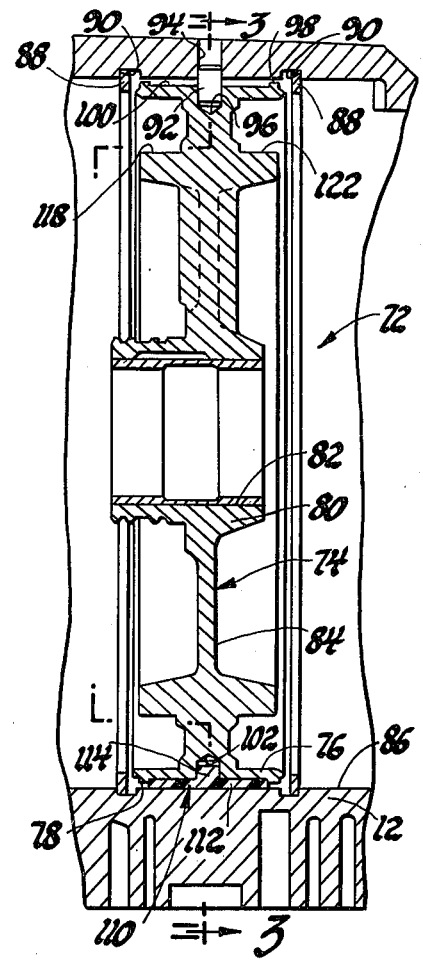
FIG. 2 is an enlarged view of a portion of FIG. 1 showing only the center support mounting according to this invention.

Referring, now, to FIGS. 1 and 2, with the clutch packs and gear sets arranged as illustrated it is necessary that structural support be provided generally toward the middle of the transmission. Such support is most conveniently provided by a new and improved center support mounting according to this invention and designated generally 72. The center support mounting 72 includes a center support member 74 having an outer annular flange 76 defining an outer cylindrical surface 78, an inner flange 80 defining an internal bore 82, and a disc-like web 84 interconnecting the inner and outer flanges 80 and 76. The outer cylindrical surface 78 of the center support member 74 is received within a cylindrical main bore 86 in the case 12 such that the internal bore 82 provides rotatable bearing support for the sleeve shaft 36. Axial movement of the center support member 74 is prevented by a pair of fore and aft retaining rings 88 mounted in a corresponding pair of grooves 90 in the case on opposite sides of the center support member. A pin 92 is disposed in a bore 94 in the case and projects from the bore into a registering bore 96 in the center support member to prevent rotation of the center support member in the case, it being understood that this arrangement is only a representative anti-rotation scheme.

Figure 3:
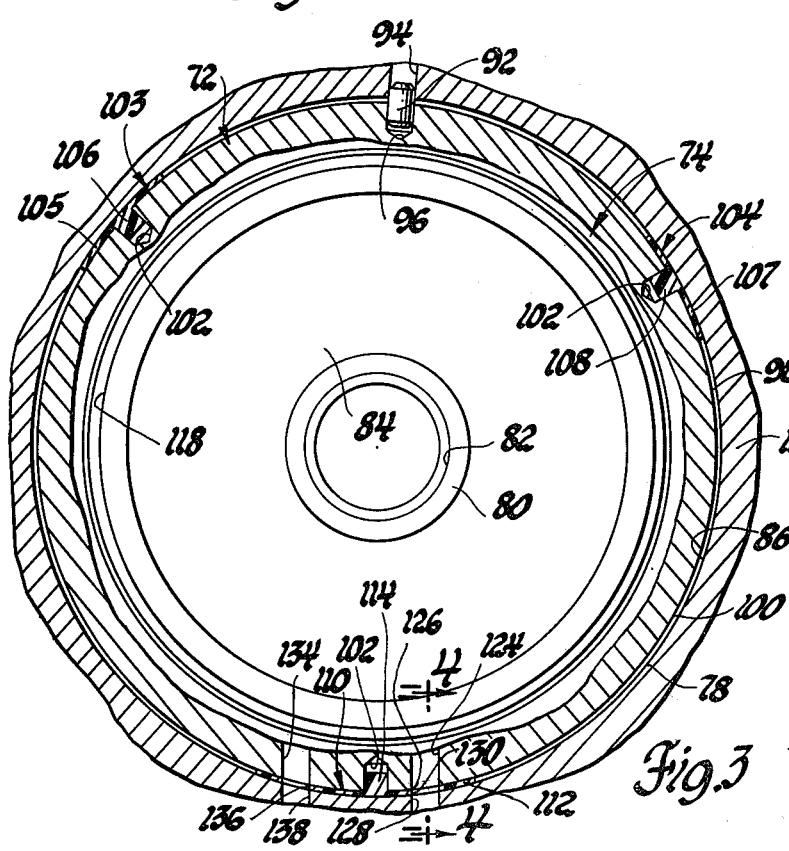
FIG. 3 is a sectional view taken generally along the plane by lines 3—3 in FIG. 2.
Figure 4:
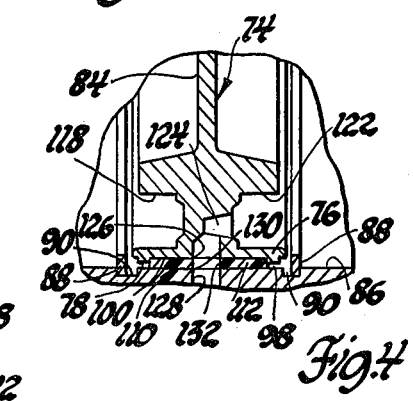
FIG. 4 is an enlarged sectional view taken generally along the plane indicated by lines 4—4 in FIG. 3.

Referring now to FIGS. 2, 3 and 4, the diameter of the outer cylindrical surface 78 on the center support member 74 is slightly smaller than the diameter of main bore 86 so that an annular gap 98 exists between the main bore 86 and the outer cylindrical surface 78, the gap 98 being shown in exaggerated fashion for clarity in FIGS. 3 and 4. A wide groove 100 is formed in the outer flange 76 and opens through the outer cylindrical surface 78 toward the gap 98. Three radially oriented bores 102 in the center support member 74 are arranged symmetrically at 120° intervals around the center support member and open radially outwardly through the groove 100 into the gap 98.

As seen best in FIGS. 3 and 4, a pair of identical shims 103 and 104 are disposed between the center support member and the main bore 86. Shim 103 includes a generally rectangular spacer portion 105 and an integral cylindrical anchor 106 while shim 104 includes a corresponding spacer portion 107 and anchor 108. The width of the spacer portions 105 and 107 generally equals the width of groove 100 in the outer flange 76 and the diameters of the cylindrical anchor portions 106 and 108 generally correspond to the diameters of bores 102 so that when the anchors are received in respective ones of the bores 102 the shims 103 and 104 are maintained in stationary positions in the groove 100. As described more fully hereinafter, the shims 103 and 104 are fabricated from elastomeric material having a coefficient of thermal expansion exceeding the coefficients of thermal expansion of the center support member and/or the case 12. A third shim 110 between the center support member 74 and case 12 includes a generally rectangular spacer portion 112 having a width corresponding to the width of groove 100 and a length somewhat longer than the lengths of spacer portions 105 and 107 on the shims 103 and 104, respectively. The third shim 110 also includes an integral cylindrical anchor 114 projecting into the third of the symmetrically spaced bores 102 in the center support member so that the third shim 110 is similarly maintained in a stationary position in the groove 100.

The shims 103 and 104 cooperate with the shim 110 in centralizing the center support member 74 in the main bore 86 throughout the normal operating temperature range of the transmission. More particularly, the thickness of the spacer portions 105, 107 and 112 is initially somewhat greater than the combined radial depths of the groove 100 and the annular gap 98. To install the center support member 74 in the main bore 86, the shims 103, 104 and 110 are inserted in the groove 100 and each of the spacer portions 105, 107 and 112 is compressed by an amount sufficient to allow the center support member 74 to be slid into the main bore. Such compression may be effected by appropriate devices similar to ordinary piston ring compressors or, alternatively, by a chamfer on the case 12 around the main bore. In either event, once the shims 103, 104 and 110 enter the main bore, the spacer portions expand into resilient contact with the main bore and slide with center support member from the installation end of the main bore to the assembled position. Since each of the shims is in compression between the center support member 74 and the main bore 86, symmetrical or balanced radially directed forces are exerted by the spacer portions 105, 107 and 112 on the center support member which forces automatically centralize the center support member in the main bore.

Each of the shims 103, 104 and 110 is fabricated from an elastomeric material which embodies sufficient elasticity to allow the spacer portions to be compressed for installation as described. In addition, the elastomeric material has a predetermined coefficient of thermal expansion selected to insure that the spacer portions remain in compression throughout the operating temperature range of the transmission. More particularly, as the transmission is operated its temperature varies between ambient and elevated operating temperatures. Both the case 12 and the center support member 74 expand and contract with changes in the transmission operating temperature and the depth of gap 98 increases, decreases or remains substantially constant depending upon the relative coefficients of thermal expansion of the case 12 and the center support member 74. To insure that each of the spacer portions 105, 107 and 112 is always in compression, the elastomeric material has a coefficient of thermal expansion sufficiently exceeding the coefficients of thermal expansion of either or both of the case 12 and the center support member 74 to insure that the spacer portions 105, 107 and 112 will always experience radial thermal expansion exceeding any possible growth of the depth of gap 98. Thus, as the transmission operating temperature varies throughout its normal range, the balanced radially directed forces exerted by the spacer portions on the center support member are maintained and the center support member is centralized in the main bore 86.

Referring again to FIGS. 3 and 4, the friction discs of third clutch pack 42 are compressed by an annular piston 116 slidably disposed in an annular cylinder 118 defined in the center support member 74. Similarly, the friction discs of fourth clutch pack 70 are compressed by an annular piston 120 slidably disposed in an annular cylinder 122 defined in the center support member 74 opposite the annular cylinder 118. A fluid passage 124 in center support member 74 extends from the cylinder 122 to the bottom of groove 100 whereat it terminates in a circular opening 126. In the assembled position of the center support member 74, the passage 124 and opening 126 register with a fluid supply passage 128 in the case 12, the supply passage 128 terminating at a port 130 generally adjacent and radially spaced from opening 126 in the center support member. The spacer portion 112 of the shim 110 is interposed between the opening 126 and the port 130 and includes a circular aperture or passage 132 aligned with the opening and the port. A flow path is thus defined from the fluid supply passage 128 to the annular cylinder 122 through the spacer portion 112 and the passage 124. The annular cylinder 118 is similarly supplied with pressurized fluid from a fluid supply passage 134 in the case 12 through an aperture 136 in the spacer portion 112 and a passage 138 in the center support member 74. Pressurized fluid is selectively directed to the supply passages 128 and 138 by a valve body assembly 139 bolted to the case 12 above the sump 14 in conventional fashion.

In addition to exerting radially directed resilient forces on the center support member for centralizing the latter as described, the spacer portion 112 of shim 110 also functions as a gasket to prevent fluid leakage. More particularly, at ambient temperature and after assembly, the spacer portion 112 is compressed between the bottom of groove 100 in the center support member and the main bore 86 so that the spacer portion 112 forms a gasket between the fluid supply passages 128 and 138 in the case and the passages 124 and 134 in the center support member, respectively, preventing fluid leakage into the gap 98. The integrity of the gasket seal, of course, depends upon the initial compression of the spacer portion 112 and can be tailored to particular applications by adjusting the amount of initial compression as, for example, by changing the thickness of the spacer portion. Further, since the spacer portion 112 is maintained in substantial compression between the center support member 74 and the main bore 86 throughout the operating temperature range of the transmission, as described hereinbefore, the integrity of the gasket seal is likewise maintained throughout the same temperature range.

Figure 5:
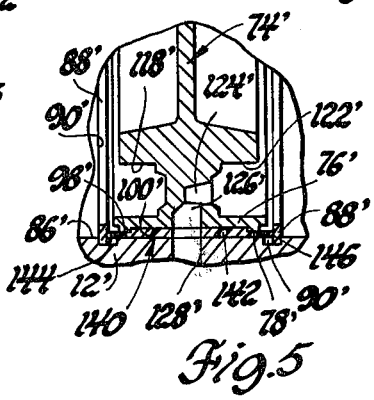
FIG. 5 is similar to FIG. 4 but showing a modified embodiment of the center support mounting according to this invention.

Referring now to FIG. 5 and describing a modified embodiment of the center support according to this invention wherein components identical to corresponding components described hereinbefore are identified with primed reference characters, a modified shim 140 is disposed between the bottom of groove 100' in the center support member 74' and the main bore 86'. The modified shim 140 is generally similar to the shim 110 described hereinbefore but includes a rectangular spacer portion 142 which is slightly wider than the width of outer flange 76' of the center support member 74'. The spacer portion 142 includes a pair of reduced thickness edges 144 and 146 which project longitudinally fore and aft through the gaps 98' between the outer cylindrical surface 78' and the main bore 86'. The fore and aft dimension of the spacer portion 142 generally corresponds to the fore and aft spacing between the retaining rings 88' disposed in the grooves 90' in the case so that, as described hereinafter, the modified shim 140 operates to eliminate tolerance between the retaining rings 88' and the center support member 74' while still functioning as a centralizing and sealing member.

With continued reference to FIG. 5, because of manufacturing tolerance accumulation in both the case 12' and the center support member 74' and in the thickness of retaining rings 88', slight clearance in the fore and aft direction may exist between the retaining rings 88' and the center support member 74' and between the retaining rings and the sides of grooves 90'. The spacer portion 142 eliminates such clearance as the operating temperature of the transmission assembly increases. That is, with a coefficient of thermal expansion exceeding that of the case 12', the elastomeric material from which the modified shim 140 is fabricated expands more than the case 12' during increases in temperature of the transmission assembly. Accordingly, the spacer portion 142 expands in the fore and aft direction relative to the case forcing the retaining rings 88' against the outside edges of the grooves 90' thus taking up any clearance which may exist. The spacer portion 142 is firmly held in the groove 100' in the center support member so that no relative movement in the fore and aft direction occurs between the spacer portion and the center support member. The retaining rings 88' thus cooperate with a pin, not shown, corresponding to pin 92 in preventing fore and aft movement of the center support member. It will, of course, be understood that the spacer portions corresponding to spacer portions 105 and 107 of each of the shims 103 and 104, respectively, are likewise modified to be somewhat wider than the outer flange 76' so that forces on the retaining rings 88' are symmetrically applied to the rings.

The embodiments of the invention in which an exclusive property or privilege is claimed are defined as follows:

1. In a transmission having a range of operating temperatures above ambient and including a case having a main bore, a center support disposed in a non-rotatable assembled position in said main bore with a cylindrical surface thereof cooperating with said main bore in defining an annular gap, fluid supply means in said case intersecting said main bore, and passage means in said center support intersecting said cylindrical surface and registering with said fluid supply means in said assembled position of said center support, the improvement comprising elastomeric centralizing and sealing means including a plurality of spacer portions arranged around said center support and disposed in compression in said gap at ambient temperature so that radially directed balanced forces are exerted on said center support by said spacer portions operative to centralize said center support in said main bore, said centralizing and sealing means having a coefficient of thermal expansion sufficiently exceeding the coefficient of thermal expansion of at least one of said case and said center support to maintain said compression throughout said operating temperature range so that said center support is centralized throughout said operating temperature range, and means on one of said plurality of compressed spacer portions defining a gasket between said center support and said main bore permitting fluid tight communication between said fluid supply means and said passage means.

2. In a transmission having a range of operating temperatures above ambient and including a case having a main bore, a center support disposed in a non-rotatable assembled position in said main bore with a cylindrical surface thereof cooperating with said main bore in defining an annular gap, fluid supply means in said case intersecting said main bore, and passage means in said center support intersecting said cylindrical surface and registering with said fluid supply means in said assembled position of said center support, the improvement comprising, a plurality of elastomeric shims each having a spacer portion, means mounting said shims symmetrically around said center support with each of said spacer portions being in compression in said gap between said cylindrical surface and said main bore at ambient temperature and with one of said compressed spacer portions being interposed between said fluid supply means and said passage means, said spacer portions being operative to exert on said center support balanced radially directed forces centralizing said center support in said main bore and each of said shims having a coefficient of thermal expansion sufficiently exceeding the coefficient of thermal expansion of at least one of said case and said center support to maintain said compression on each of said spacer portions throughout said operating temperature range so that said center support is centralized in said main bore throughout said operating temperature range, and means on said one spacer portion operative to permit fluid communication between said fluid supply means and said passage means so that said one spacer portion defines a gasket preventing fluid leakage into said gap.

3. In a transmission having a range of operating temperatures above ambient and including a case having a main bore, a center support disposed in a non-rotatable assembled position in said main bore with a cylindrical surface thereof cooperating with said main bore in defining an annular gap, a pair of retaining ring grooves in said case on opposite sides of said center support, a pair of retaining rings in respective ones of said grooves with clearance between each of said rings and said center support and between each of said rings and side surfaces of said grooves, fluid supply means in said case intersecting said main bore, and passage means in said center support intersecting said cylindrical surface and registering with said fluid supply means in said assembled position of said center support, the improvement comprising a plurality of elastomeric shims each having a spacer portion and integral anchoring means, means mounting said shims symmetrically around said center support with said anchoring means engaging said center support to foreclose bodily shiftable movement of said shims relative to said center support and with each of said spacer portions being in compression in said gap between said cylindrical surface and said main bore at ambient temperature and with one of said compressed spacer portions being interposed between said fluid supply means and said passage means, said spacer portions being operative to exert on said center support balanced radially directed forces centralizing said center support in said main bore, means on each of said spacer portions defining edges parallel to and adjacent corresponding ones of said retaining rings, each of said shims having a coefficient of thermal expansion sufficiently exceeding the coefficients of thermal expansion of said case and said center support to maintain each of said spacer portions in compression throughout said operating temperature range and to eliminate said clearance through thermal expansion engagement of said parallel edges on corresponding ones of said retaining rings at said operating temperatures above ambient, and means on said one spacer portion operative to permit fluid communication between said fluid supply means and said passage means so that said one spacer portion defines a gasket preventing fluid leakage into said gap.

* * * * *